United States Patent [19]

Ryan

[11] Patent Number: 4,609,912

[45] Date of Patent: Sep. 2, 1986

[54] DETECTOR SYSTEM FOR DETECTING AIR INFILTRATION LEAKS AND THE LIKE

[76] Inventor: Stewart R. Ryan, P.O. Box 2711 Willow Creek, Norman, Okla. 73071

[21] Appl. No.: 466,090

[22] Filed: Feb. 14, 1983

[51] Int. Cl.[4] .......................... G08B 21/00; G01F 1/68
[52] U.S. Cl. ...................... 340/603; 73/204; 340/599
[58] Field of Search .............. 340/603, 605, 599, 606, 340/610, 611, 614; 73/40, 861.63, 27 R, 46, 204, 40.5 R; 200/81.9 R, 56 R; 137/551

[56] References Cited

U.S. PATENT DOCUMENTS

| | | | |
|---|---|---|---|
| 3,069,849 | 12/1962 | Crim | 73/861.63 X |
| 3,187,558 | 6/1965 | Koncen et al. | 340/605 X |
| 3,238,775 | 3/1966 | Watts | 374/30 |
| 3,369,402 | 2/1968 | Elagib | 73/204 X |
| 3,374,673 | 3/1968 | Trageser | 73/861.63 X |
| 3,636,540 | 1/1972 | Harris | 340/599 X |
| 3,695,094 | 10/1972 | Hulme | 340/605 X |
| 3,786,675 | 1/1974 | Delatorre et al. | 340/605 X |
| 3,864,960 | 2/1975 | Fletcher et al. | 340/605 X |
| 3,894,562 | 7/1975 | Moseley, Jr. et al. | 73/861.63 X |
| 3,924,445 | 12/1975 | Konomi et al. | 73/861.63 X |
| 3,942,378 | 3/1976 | Olmstead | 73/204 |
| 3,987,662 | 10/1976 | Hara et al. | 340/605 X |
| 3,987,788 | 10/1976 | Emil | 73/204 X |
| 3,991,624 | 11/1976 | Davies | 73/204 X |
| 3,995,481 | 12/1976 | Djorup | 73/204 X |
| 4,055,074 | 10/1977 | Thimons et al. | 73/40 |
| 4,083,244 | 4/1978 | Agar et al. | 73/204 |
| 4,090,179 | 5/1978 | Hirano | 340/605 |
| 4,287,581 | 9/1981 | Neale, Sr. | 340/605 X |
| 4,481,828 | 11/1984 | Cheng | 73/861.63 |

FOREIGN PATENT DOCUMENTS

| | | | |
|---|---|---|---|
| 488677 | 12/1952 | Canada | 340/603 |
| 602625 | 8/1960 | Canada | 340/603 |
| 1036246 | 8/1978 | Canada | . |
| 1026602 | 4/1966 | United Kingdom | 73/861.63 |

Primary Examiner—James L. Rowland
Assistant Examiner—Thomas J. Mullen, Jr.
Attorney, Agent, or Firm—Dunlap, Codding & Peterson

[57] ABSTRACT

A detector system for detecting air flow wherein air flow is sensed by a first detector and air flow is sensed by a second detector which is spaced a distance from the first detector, the first and the second detectors each providing output indications indicating the respective sensed air flows. The detector system includes means for receiving the output indications provided by the first and the second detectors and for providing an output indication in response to an increase in one of the first and the second detector output indications, thereby providing an output indication indicating an increase in the air flow sensed by one of the first and the second detectors relative to the air flow sensed by the other one of the first and the second detectors.

25 Claims, 3 Drawing Figures

DETECTOR SYSTEM FOR DETECTING AIR INFILTRATION LEAKS AND THE LIKE

BACKGROUND OF THE INVENTION

1. Field of the Invention

The present invention relates generally to air flow detectors and, more particularly, but not by way of limitation, to a detector system for detecting air infiltration leaks.

2. Brief Description of the Prior Art

The total air infiltration can be measured using rather sophisticated tracer gas techniques such as those discussed in an article entitled "A Prototype Semi-Automatic System For Measuring Air Infiltration In Buildings Using Sulphur Hexaflouride As a Tracer", C. M. Hunt and S. J. Treado, National Bureau of Standards, Technical Note No. 898 (1976). However, this test does not locate leaks which must be found by other methods. As the air flow velocity in an infiltration site may be into or out of the structure or building or may be zero depending on the ambient conditions, any technique to locate all of the air infiltration leaks generally will require a fan or blower to produce a unidirectional flow at all of the potential air infiltration leak sites. One technique to locate air infiltration leaks employs an IR imaging device, in conjunction with a large blower, to detect the temperature differences produced at the air infiltration leak site by the infiltrating air. This technique is fast and effective, but, requires a rather large capital investment. Another technique utilizes a sound source inside the building and a sound detector outside the building where an increase in sound level indicates a leak as described in Brookhaven National Laboratory Report 50952 (1978). Alternatively, a smoke generator can be employed inside a pressurized house to locate leaks by observing the efflux of smoke, "Retrofitting An Existing Wood-Frame Residence For Energy Conservation", D. M. Burch and C. M. Hunt, National Bureau of Standards Building Science Series No. 105 at page 71. While this last-mentioned system is inexpensive and simple to use, the smoke is slightly toxic and presents a health hazard for the operator.

In principle, it is possible to use a conventional, sensitive electronic anemometer or air motion detector to locate the influx of air through air infiltration sites produced by a blower. In practice, the motion of such an anemometer when used to scan the interior structure for infiltration sites creates a spurious air velocity in the anemometer which is typically larger than the velocity of the infiltrating air thereby rendering the instrument useless. It is one of the goals of this invention to eliminate the indication of such spurious signals by utilizing an electronic anemometer in a novel differential configuration.

DESCRIPTION OF THE PREFERRED EMBODIMENT

Figure 1:
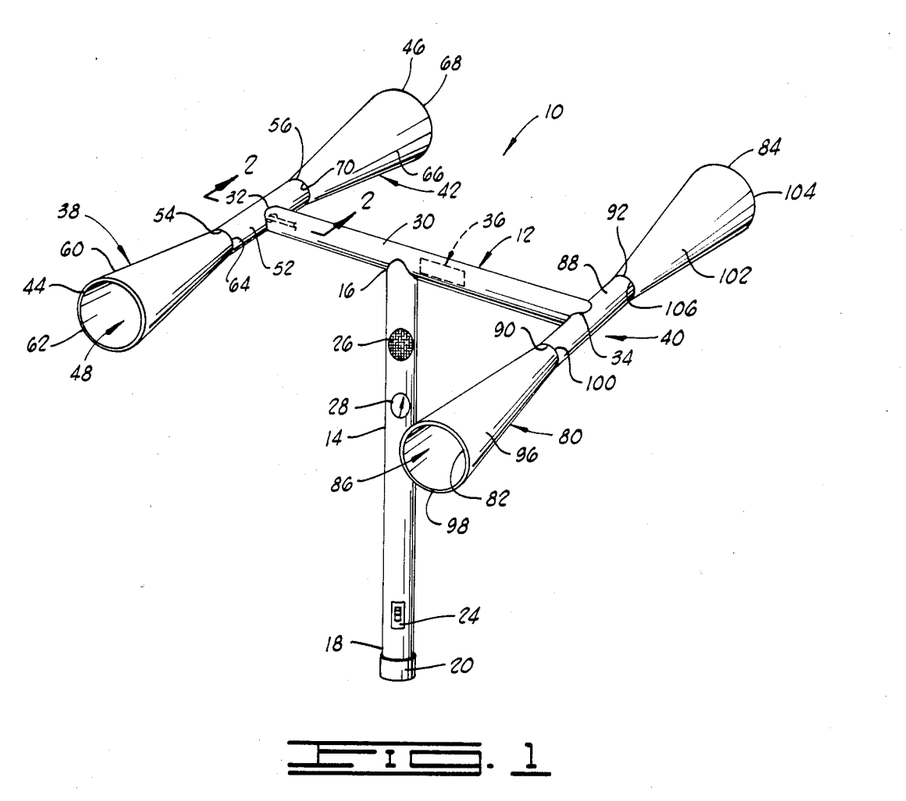
FIG. 1 is a diagrammatic view of a detector system which is constructed in accordance with the present invention.

Referring to the drawings in general, and to FIG. 1 in particular, shown therein and designated via the general reference numeral 10 is a detector system for detecting air infiltration leaks which is constructed in accordance with the present invention. More particularly, the detector system 10 is constructed for detecting air infiltration leaks in a substantially enclosed or enclosable structure, such as a building or a room within a building, for example, which includes a probe 12. In general, a negative air pressure is created within the structure by locating a fan within a window or other opening in the structure to blow air out of the structure thereby causing air to flow into the structure through the air infiltration sites. By way of example, a twenty inch window fan with a ventilating rate of about 2000 cubic foot per minute can produce a pressure differential of about one to about three millimeters of water in a structure with the doors and windows closed. This typically is in the range of indoor to outdoor pressure differentials produced by a twenty mile per hour wind if air infiltration leaks are uniformly distributed throughout the structure. Therefore, a portable window fan is capable of infiltration velocities comparable to those responsible for the heat infiltration loss.

The probe 12 is then moved to a position generally near suspected air infiltration leak sites, the probe 12 sensing or detecting air infiltration leaks induced by the pressure differential and providing an output indication of such detected or sensed air infiltration leaks. The minimum useful velocity sensitivity of the probe 12 is determined by the spurious signals or "noise" caused by large scale air currents in the structure and the air flow induced by motion of the probe 12. Although the large scale air currents and air flow induced by motion of the probe 12 are typically on the order of 0.1 meters per second, the detector system 10 substantially reduces the effect of these spurious signals. The response time of the probe 12 preferably is rapid enough (less than one second) so that an air infiltration leak can be localized by passing the probe 12 back and forth across or near the air infiltration leak.

Air infiltration can be the single largest source of heat loss in a conventionally constructed house structure. However, aside from the admonition to caulk, infiltration generally is ignored in an energy audit or an energy retrofit because it is difficult to locate air infiltration sites. Unfortunately, caulking fails to seal many of the major air infiltration leaks and, as a consequence, energy conservation measures often do not result in the predicted savings. A safe, simple and inexpensive technique for locating air infiltration sites in a building structure can produce substantial energy savings and the detector system 10 of the present invention is adapted to provide such a system.

Air infiltration is produced generally by two effects. First, wind passing over and around the structure produces a negative pressure on one side of the building structure exhausting warm interior air and a positive pressure on the other side forcing the cold outside air into the structure. Second, the inside-outside temperature difference creates a chimney effect which is effective in drawing in outside air through leaks at ground level and exhausting interior air at upper attic levels. The rate at which air infiltrates is measured generally in units of air-changes-per-hour (ach) wherein an air infiltration rate of one ach corresponds to a volume of air equal to the volume of the structure being exhausted per hour. A typical air exhaustion rate for residential structures has been determined to be between 0.3 and 1.5 ach, where the latter (1.5 ach) number is more common. Although air infiltration can represent a major heat loss, it is not desirable to completely seal a house structure, since some ventilation is required to replenish oxygen and remove interior pollutants. Generally an air infiltration rate in the range of about 0.3 ach to about 0.5 ach is considered sufficient to prevent the house structure from becoming "stuffy".

The heat loss due to an air infiltration rate of about 1 ach in a 1200 square foot house structure is equal to the heat that would be lost if one entire wall of the house structure were replaced by a single pane glass window, approximately six foot high. If constructed using conventional insulation standards, heat loss in the house structure could be reduced about 30 percent, if the air infiltration rate were reduced to about 0.3 ach.

Thus, the detector system 10 of the present invention is adapted to provide a relatively safe, simple and inexpensive technique for locating air infiltration sites in a house or building or room within a house or building or other such structure, so such air infiltration sites can be repaired to effect substantial energy savings with respect to heating and cooling the structure. In addition, there are other structures, such as "air handling ducts" and "clean rooms", for example, wherein air infiltration sites can represent a substantial detriment to the desired operation of such structures and the detector system 10 of the present invention also is adapted to detect or locate air infiltration sites in these types of structures so such located or detected air infiltration sites can be repaired to maintain the desired operability standards of such structures.

Figure 3:
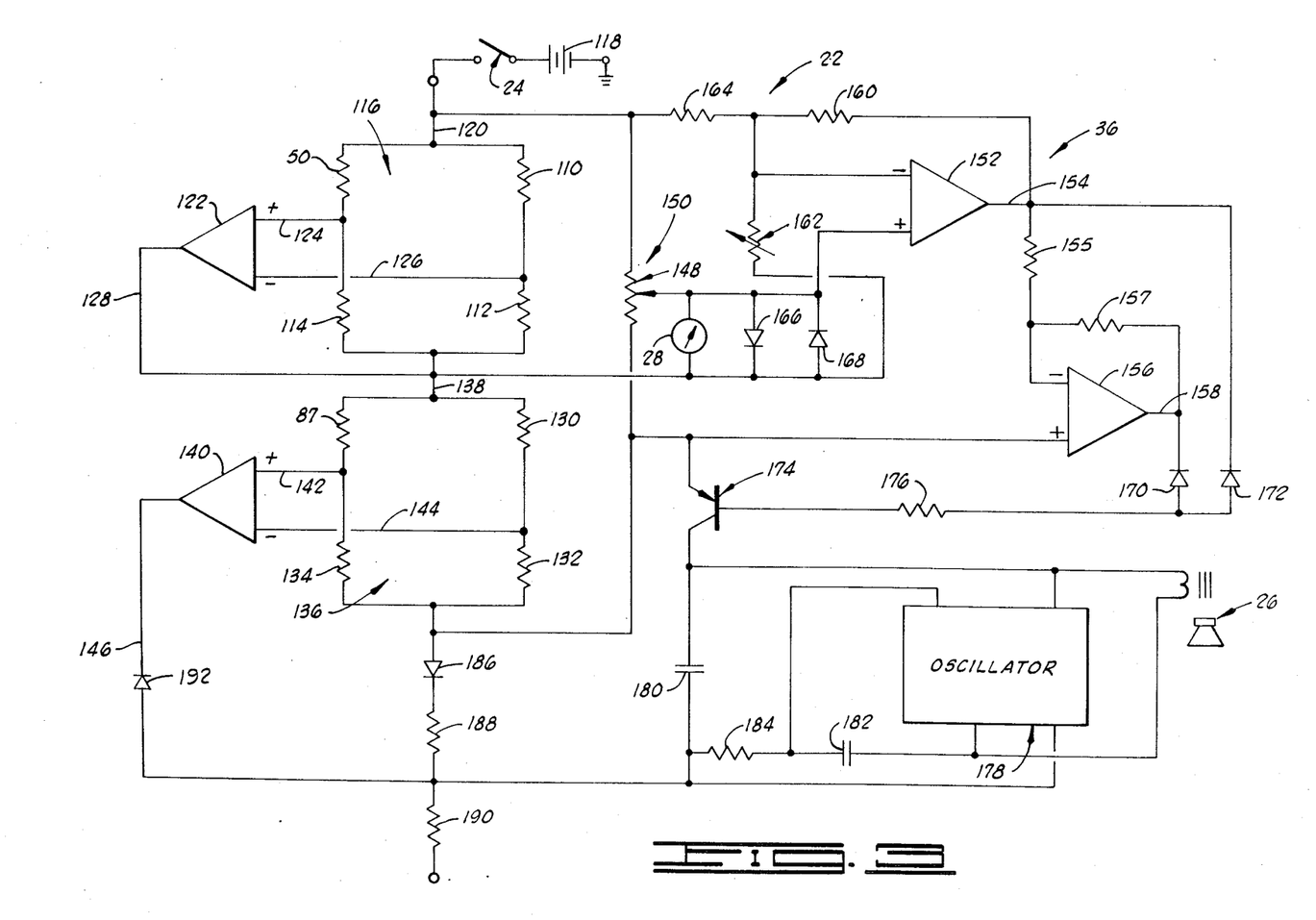
FIG. 3 is a schematic view of the control circuit of the detector system of FIG. 1.

As shown in FIG. 1, the probe 12 includes a cylindrically-shaped arm 14 having a first end 16 and a second end 18. The arm 14 is hollow and an opening (not shown) which extends through the arm 14, intersecting the first and the second ends 16 and 18 thereof. A cap 20 is secured to the second end 18 of the arm 14 to close the opening in the arm 14, generally at the second end 18 thereof. The opening through the arm 14 and the arm 14 are adapted to receive and support portions of a detector control 22 (as shown in FIG. 3) in a manner which will be described in greater detail below.

An on-off switch 24 is supported on the arm 14 and the on-off switch 24 is a portion of the detector control 22. The on-off switch 24 functions to activate the detector control 22 and to condition the detector control 22 in an off mode of operation.

In an on mode of operation, the probe 12 functions to detect or sense air infiltration leaks.

As mentioned before, the detector system 10 is adapted to provide an output indication indicating detected or sensed air infiltration leaks and, as shown in FIG. 1, the detector control 22 includes a speaker 26 which is supported on and connected to the arm 14. The speaker 26 is a portion of the detector control 22 and the speaker 26 functions to provide an audibly perceivable output indication indicating a detected or sensed air infiltration leak in the on operating mode of operation of the detector system 10.

In addition to the speaker 26, the detector control 22 also includes a meter 28 which is supported on and connected to the arm 14. The meter 28 is adapted to provide a visually perceivable output indication indicating a detected or sensed air infiltration leak during the operation of the detector system 10 in the on mode of operation thereof.

The detector 12 also includes a generally cylindrically shaped support 30 which has a first end 32 and a second end 34. The support 30 is generally cylindrically shaped and is hollow, having an opening (not shown) extending therethrough and intersecting the first and second ends 32 and 34. The opening in the support 30 is adapted to cooperate with the opening in the arm 14 to support and house portions of the detector control 22. The first end 16 of the arm 14 is connected and secured to the support 30 at a mid-position, generally midway between the first and the second ends 32 and 34 of the support 30. Thus, the first end 32 portion of the support 30 extends in one direction generally perpendicularly from the first end 16 of the arm 14 and the opposite first end portion 34 of the support 30 extends in an opposite direction generally perpendicularly from the first end 16 of the arm 14.

The detector control 22 includes a detector control circuit 36 and, as shown in FIG. 1, the detector control circuit 36 is disposed within the opening through the support 30 and the support 30 functions to house and support the detector control circuit 36. It should be noted that the detector control circuit 36 could be supported within the opening in the arm 14, depending upon the desired location in a particular application. The on-off switch 24, the speaker 26 and the meter 28 each are connected to the detector control circuit 36 in a manner which will be described in greater detail below.

The probe 12 includes a first detector assembly 38 and a second detector assembly 40. The first detector assembly 38 is connected to and supported generally on the first end 32 portion of the support 30 and the second detector assembly 40 is connected to and supported generally on the second end 34 portion of the support 30.

Figure 2:
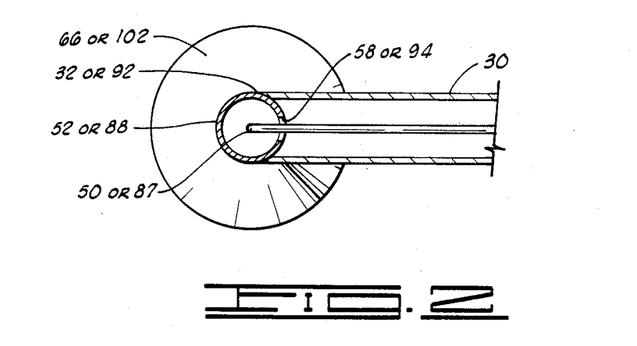
FIG. 2 is a typically sectional view taken through the base portion of the first or second detector housings.

The first detector assembly 38 includes a first detector housing 42 having a first end 44 and a second end 46. An opening 48 extends through the first detector housing 42, intersecting the first and the second ends 44 and 46 thereof. A first detector 50 (shown in FIG. 2) is supported within the opening 48 in the first detector housing 42 and the first detector 50 is connected to a portion of the first detector housing 42, the first detector 50 being generally supported within the opening 48 of the first detector housing 42. The first detector 50 is adapted to detect or sense the air flow through the opening 48 in the first detector housing 42 and to cooperate in providing an output indication indicating the detected or sensed air flow through the opening 48 in the first detector housing 42. The first detector 50 is connected to and forms one of the components of the detector control 22 in a manner which will be described in greater detail below.

The first detector housing 42 includes a cylindrically, tubular shaped base 52 having a first end 54 and a second end 56. An opening (shown in FIG. 2) extends through the base 52 intersecting the opposite first and second ends 54 and 56 thereof. A detector opening 58 (shown in FIG. 2) is formed through the base 52 and intersects the opening which extends through the base 52, the detector opening 58 being located or disposed generally between the opposite first and second ends 54 and 56 of the base 52. The first detector 50, more particularly, is supported within the detector opening 58 in the base 52 such that a portion of the first detector 50 extends into the opening formed through the base 52 and intersecting the first and second ends 54 and 56 thereof or, in other words, extends into the opening 48 formed through the first detector housing 42. The opening (not shown) through the base 52 forms a portion of the opening 48 which extends through the first detector housing 42.

The first detector housing 42 includes a first section 60 having a first end 62 and a second end 64. An opening extends through the first section 60 and intersects the opposite first and second ends 62 and 64 thereof, the opening through the first section 60 forming a portion of the opening 48 which extends through the first detector housing 42. The walls forming the first section 60 extend in a generally outwardly direction from the second end 64 thereof toward the first end 62 thereof, thereby forming a conical-shaped first section 60. The second end 64 of the first section 60 is secured to the first end 54 of the base 52 such that the opening through the first section 60 is aligned generally with the opening through the base 52, the conical-shaped first section 60 extending in one direction from the first end 54 of the base 52 and the walls of the first conicalshaped section 60 extending in a generally outwardly direction from the first end 54 of the base 52 toward the first end 62 of the first section 60. The first end 62 of the first section 60 forms the first end 44 of the first detector housing 42.

The first detector housing 42 also includes a second section 66 having a first end 68 and a second end 70. An opening extends through the second section 66 and intersects the opposite first and second ends 68 and 70 thereof. The walls forming the second section 66 are flared outwardly from the second end 70 toward the first end 68 thereof, thereby forming a conical-shaped second section 66. The second end 70 of the second section 66 is secured to the second end 56 of the base 52 such that the opening through the second section 66 is aligned with the opening through the base 52. The second section 66 extends from the second end 56 of the base 52 toward the first end 68 of the second section 66, the first end 68 of the second section 66 forming the second end 46 of the first detector housing 42.

The first detector housing 42, comprised of the base 52, the first section 60 and the second section 66, is in the configuration of a venturi tube.

In a preferred form, the second detector housing 80 is constructed exactly like the first detector housing 42. The second detector assembly 40 includes a second detector housing 80 having a first end 82 and a second end 84. An opening 86 extends through the second detector housing 80, intersecting the first and the second ends 82 and 84 thereof. A second detector 87 (shown in FIG. 2) is supported within the opening 86 in the second detector housing 80 and the second detector 87 is connected to a portion of the second detector housing 80, the second detector 87 being generally supported within the opening 86 of the second detector housing 80. The second detector 87 is adapted to detect or sense air flow through the opening 86 in the second detector housing 80 and to cooperate in providing an output indication indicating the detected or sensed air flow through the opening 86 in the second detector housing 80. The second detector 87 is connected to and forms one of the components of the detector control 22 in a manner which will be described in greater detail below.

The second detector housing 80 includes a cylindrically, tubular shaped base 88 having a first end 90 and a second end 92. An opening (shown in FIG. 2) extends through the base 88 intersecting the opposite first and second ends 90 and 92 thereof. A detector opening 94 is formed through the base 88 and intersects the opening which extends through the base 88, the detector opening 94 being located or disposed generally between the opposite ends 90 and 92 of the base 88. The second detector 87, more particularly, is supported within the detector opening 94 in the base 88 such that a portion of the second detector 87 extends into the opening formed through the base 88. The opening through the base 88 forms a portion of the opening 86 which extends through the second detector housing 80.

The second detector housing 80 includes a first section 96 having a first end 98 and a second end 100. An opening (not shown) extends through the first section 98 and intersects the opposite first and second ends 98 and 100 thereof, the opening through the first section 96 forming a portion of the opening 86 which extends through the second detector housing 80. The walls forming the first section 96 extend in a generally outwardly direction from the second end 100 thereof toward the first end 98 thereof, thereby forming a conical-shaped first section 96. The second end 100 of the first section 96 is secured to the first end 90 of the base 88 such that the opening through the first section 96 is aligned generally with the opening through the base 88. The conical-shaped first section 96 extends in one direction from the first end 90 of the base 88 and the walls of the first conical-shaped section 96 extend in a generally outwardly direction from the second end 90 of the base 88 toward the first end 98 of the first section 96, the first end 98 of the first section 96 forming a first end 82 of the second detector housing 80.

The second detector housing 80 also includes a second section 102 having a first end 104 and a second end 106. An opening (not shown) extends through the second section 102 and intersects the opposite first and second ends 104 and 106 thereof. The walls forming the second section 102 are flaired outwardly from the second end 106 toward the first end 104 thereof thereby forming a conical-shaped second section 104. The second end 106 of the second section 102 is secured to the second end 92 of the base 88 such that the opening through the second section 102 is aligned with the opening through the base 88. The second section 102 extends from the second end 92 of the base 88 toward the first end 104 of the second section 102, the first end 104 of the second section 102 forming the second end 84 of the second detector housing 80.

The second detector housing 80, comprised of the base 88, the first section 96 and the second section 102, is in the configuration of a venturi tube.

The opening 48 through the first detector housing 42 extends generally along an axial centerline axis and the centerline axis of the opening 48 is substantially parallel with the axial centerline opening 86 through the second detector housing 80.

The arm 14 of the probe 12 is adapted such that the arm 14 can be grippingly engaged by an individual, the individual supporting the probe 12 via the gripping engagement with the arm 14. In general, the probe 12 is operated by the individual initially moving the on-off switch 24 to the on position thereby placing the detector control 22 in the on mode of operation. In the on mode of operation, the individual then moves the probe 12 to position the first or the second ends 44 or 46 of the first detector housing 42 or to position the first or the second ends 82 and 84 of the second detector housing 80 generally near or in close proximity to suspected air infiltration leak sites. Assuming the first or the second end 44 or 46 of the first detector housing 42 is positioned in close proximity to an air infiltration site, the air leaking from the air infiltration site will move through the opening 48 of the first detector housing 42. The air from the air infiltration site moving through the opening 48 of the first detector housing 42 is sensed or detected by the first detector 50 and the first detector 50 provides an output indication of the sensed or detected air movement through the opening 48 in the first detector housing 42. The detector control 22 receives the output indication of the first detector 50 and the second detector 87 portions of the detector control 22 and operates to provide a visual output indication via the meter 28 and an audible indication via the speaker 26 indicating a detected or sensed air infiltration site, such visual and audible indications indicating that the detected or sensed air infiltration site is the result of air from the detected or sensed air infiltration site moving through the opening 48 in the first detector housing 42 since the air flow through the opening 48 in the first detector housing 42 has increased as a result of air flow from the air infiltration site with respect to the air flow through the opening 86 in the second detector housing 80.

Assuming the first or the second end 82 or 84 of the second detector housing 80 is positioned in close proximity to an air infiltration site, the air leaking from the air infiltration site will move through the opening 86 of the second detector housing 80. The air from the air infiltration site moving through the opening 86 of the second detector housing 80 is sensed or detected by the second detector 87 and the second detector 87 provides an output indication of the sensed or detected air flow through the opening 86 in the second detector housing 80. The detector control 22 receives the output indication of the first and second detectors 50 and 87 portions of the detector control 22 and operates to provide a visual output indication via the meter 28 and an audible indication via the speaker 26 indicating a detected or sensed air infiltration site, such visual and audible indications indicating that the detected or sensed air infiltration site is the result of air from the detected or sensed air infiltration site moving through the opening 86 in the second detector housing 80 since the air flow through the opening 86 in the second detector housing 80 has increased as a result of air flow from the air infiltration site with respect to the air flow through the opening 48 in the first detector housing 42.

Air flow which results from relatively large air flows within the structure and from moving the probe 12 or, more particularly, the first and second detector housings 42 and 80 throughout the structure to position the probe 12 near suspected air infiltration sites will result in substantially equal air flow through both the openings 48 and 86 or, in other words, in substantially equal air flow past the first and the second detectors 50 and 87. Thus, there is no increase in air flow past one of the first and the second detectors 50 and 87 with respect to the other one of the first and the second detectors 50 and 87 in these instances and the detector control 22 is adjusted so no output indication is produced in these instances. Thus, the probe 12 is substantially insensitive to large-scale air currents within the structure and to the motion of the probe 12 as the probe 12 is moved to locate air infiltration sites.

Enclosing the first and second detectors 50 and 87 in relatively short, straight tubular sections (the bases 52 and 88) substantially eliminates noise from air currents and motion generally perpendicular to the axis of the respective openings 48 and 86 through the first and the second detector housing 42 and 80. The venturi-shaped detector housings 42 and 80 increases the sensitivity of the probe 12 which permits the probe 12 to be positioned a greater distance from the suspected air infiltration leak site and yet still function to detect air flow from such suspected air infiltration site. In addition, such venturi-shaped detector housings 42 and 80 permit a probe 12 construction which does not have to be positioned as accurately relative to the suspect air infiltration sites as would be necessary if the first and the second detector housings 42 and 80 were constructed of relatively straight, tubular sections.

The detector control 22, including the detector control circuit 36 portion thereof, is shown schematically in greater detail in FIG. 3. The first detector 50 and the second detector 87 comprise portions of the detector control 22 and, as shown in FIG. 3, the first detector 50 is schematically shown as a resistor and the second detector 87 is schematically shown as a resistor.

More particularly, the first detector 50 and the second detector 87 each are thermistors operated in which is generally called the self-heated mode in which the electrical power dissipated in the thermistor raises its temperature above the temperature of the ambient air. Such thermistors are of the type commercially available from such sources as Fenwal, Inc., Ashland, Mass., an example being Model GB31J1, this type of thermistor being 1000 ohm nominal thermistor with leads adjacent on the bead, although it should be noted that the Fenwal, Inc. Model GB31L1 (1000 ohm nominal with axial leads) does provide improved results when used as a thermistor in the detector system 10 of the present invention. The probe 12 is designed to have minimized battery drain and the thermistor first and second detectors 50 and 87 are selected to use the same battery operating supply 118 as the control circuit 22. For these reasons, thermistors are utilized as the first and second detectors 50 and 87 instead of hot-wire elements often used in prior art although the hot-wire elements could also be employed, the term "thermistor" as used herein includes "hot-wire elements".

The first detector 50 thermistor is shown schematically in FIG. 3 as a resistor which is connected to three other resistors 110, 112 and 114 such that the resistors 50, 110, 112 and 114 are electrically interconnected to form a first bridge network 116, the first bridge network 116 being of the type commonly referred to in the art as a "Wheatstone Bridge".

The first bridge network 116 is connected to the positive side of an electrical power supply 118 via a conductor 120 and the switch 24 is interposed in the conductor 120 generally between the first bridge network 116 and the electrical power supply 118. More particularly, the power input to the first bridge network 116 is connected to terminals generally between the thermistor first detector 50 and the resistor 110. When the products of the resistors $[(R_{112})(R_{50}) \neq (R_{110})(R_{114})]$ are not equal, the first bridge network 116 is not in balance and the first bridge network 116 produces a first bridge error signal which is obtained at terminals generally between the resistors 110 and 112 and generally between the resistor 114 and the thermistor first detector 50. The operation of bridges to produce error signals is well known in the art.

The first bridge error signal is connected to an operational amplifier 122 via conductors 124 and 126, the conductor 124 being connected generally between the resistances 114 and 50 (first detector 50) and the conductor 126 being connected between the resistors 110 and 112. The operational amplifier 122 amplifies the received first bridge error signal and the amplified first bridge error signal is provided at the operational amplifier 122 output on a conductor 128. The conductor 128 is connected to the first bridge network 116 and, more particularly, the conductor 128 is connected to the first bridge network 116 generally between the resistors 112 and 114 thereby feeding the amplified first bridge error signal back to the first bridge network 116.

The thermistor first detector 50 has a resistance value which varies with temperature of the thermistor first detector 50. Thus, as the air flow past the thermistor first detector 50 varies, the temperature of the thermistor first detector 50 changes and, accordingly, the resistance value of the thermistor first detector 50 changes, thereby causing an unbalanced condition in the first bridge network 116 which results in a first bridge error signal being produced. Since the first bridge error signal is fed back to the power input of the first bridge network 116, the first bridge error signal causes the current flowing through the thermistor first detector 50 to increase or decrease according to the change in the first bridge error signal, which results in the temperature of the thermistor first detector 50 increasing or decreasing in an effort to bring the temperature and, thus, the resistance value of the thermistor first detector 50 to a value where the first bridge network 116 again is in balance.

The operation of a self-heated detector in a bridge with such a feed back configuration is well known and is described in *Transducer Interfacing Handbook*, Ed. by D. Seingold, Analog Devices, Inc., Norwood, Mass. (1980) pages 205–207.

The second detector 87 is connected to four resistors 87, 130, 132 and 134, the four resistors 87, 130, 132 and 134 being electrically connected to form a second bridge network 136 of the type commmonly referred to in the art as a "Wheatstone Bridge". The second bridge network 136 is connected in electrical series with the first bridge network 116 in part via a conductor 138.

The second bridge network 136 is connected such that the power input to the second bridge network 136 is connected to terminals generally between the resistors 132 and 134 and generally between the thermistor second detector 87 and the resistor 130. As mentioned before with respect to the first bridge network 116, when the products of the resistors $[(R_{130})(R_{134}) \neq (R_{87})(R_{132})]$ are not equal, the second bridge network 136 is not in balance and the second bridge network 136 produces a second bridge error signal which is obtained at terminals generally between the resistors 130 and 132 and generally between the resistor 134 and the thermistor second detector 87.

The second bridge error signal is connected to an operational amplifier 140 via conductors 142 and 144. The conductor 142 is connected generally between the resistors 87 and 134 and the conductor 144 is connected generally between the resistors 130 and 132. The operational amplifier receives the second bridge error signal produced by the second bridge network 136 and the operational amplifier 140 amplifies the received second bridge error signal. The amplified second bridge error signal is provided on a conductor 146 which is connected to the second bridge network 136 through LED 186 and resistor 188 so that the amplified second bridge error signal is fed back to the second bridge network 136.

The thermistor second detector 87 has a resistance value which varies with the temperature of the thermistor second detector 87. Thus, as the air flow past the thermistor second detector 87 varies, the temperature of the thermistor second detector 87 changes and, accordingly, the resistance value of the thermistor second detector 87 changes, thereby causes an unbalance condition in the second bridge network 136 which results in a second bridge error signal being produced. Since the second bridge error signal is fed back to the power input of the second bridge network 136, the second bridge error signal causes the current flowing through the thermistor second detector 87 to increase or decrease accordingly to the change in the second bridge error signal, which results in the temperature of the thermistor second detector 87 increasing or decreasing in an effort to bring the temperatures and, thus, the resistance value of the thermistor second detector 87 to a value where the second bridge network 136 again is in balance.

The first and the second bridge networks 116 and 136 are connected in series and the first and the second bridge networks 116 and 136 each are connected to a potentiometer variable resistor 148 such that the first and the second bridge networks 116 and 136 and the potentiometer 148 form a third bridge network 150.

The third bridge network 150 receives a power input at terminals generally between one side of the potentiometer variable resistor 148 and the first bridge network 116 and generally between the other side of the potentiometer variable resistor 148 and the second bridge network 136. When the third bridge network 150 is balanced, the third bridge network 150 does not produce an error signal. However, when the third bridge network 150 is unbalanced, the third bridge network 150 produces a third bridge error signal at terminals generally between the first and second bridge networks 116 and 136 and generally between the resistance portion of the potentiometer variable resistor 148.

The current meter 28 is connected to the third bridge network 150 such that the third bridge error signal produced by the third bridge network 150 passes through the meter 28 and, thus, the meter 28 provides a visual output indication of the third bridge error signal.

The third bridge error signal is connected to the input of an operational amplifier 152. The operational amplifier 152 amplifies the third bridge error signal and provides the amplified third bridge error signal on a conductor 154. The amplified third bridge error signal is connected to the input of an inverter 156. The inverter 156 inverts the amplified third bridge error signal and the inverter 156 provides the inverted third bridge error signal on a conductor 158. A resistor 155 is interposed between the operational amplifier 152 and the inverter 156 and the output of the inverter 156 is fed back through a resistor 157.

The output of the operational amplifier 152 is biased through resistors 160 and 164. A variable resistor 162 is interposed between the third bridge network 150 and the input to the operational amplifier 152 for cooperating with the resistor 160 to control the gain of the operational amplifier 152.

A pair of diodes 166 and 168 are connected in parallel with the meter 28 for protecting the meter 128.

A diode 170 is connected to the inverter 156 output signal and another diode 172 is connected to the operational amplifier 152 output signal. The diodes 170 and 172 cooperate and function to select the most negative voltage, either the inverter 156 output signal or the operational amplifier 152 output signal, and this selected output signal is connected to the base of a transistor 174 through a resistor 176.

The collector of the transistor 174 is connected to an oscillator 178 and, in the "on state" of the transistor 174, the transistor 174 conducts current to the oscillator 178, thereby causing the oscillator 178 to provide an oscillating output signal which is connected to the speaker 26. The speaker 26 provides an audible output indication in response to receiving the oscillator 178 output signal. Capacitors 180 and 182 and a resistor 184 are connected between the transistor 174 and the oscillator 178.

An LED 186 is connected to the third bridge network 150 generally between the output of the amplifier 140 and the third bridge network 150, such that the LED 186 is in series with the first and the second detectors 50 and 87. The LED 186 provides a visual output indication indicating that the control circuit 22 is in the "on" condition. A resistor 188 is connected in series with the LED 186.

A resistor 190 is connected between the negative side of the battery power supply 118 (or ground) and the output of the operational amplifier 140. A diode 192 is interposed in the conductor 146. The diode 192 and the resistor 190 aid in turning the control circuit 22 to the "on" condition.

In operation of the detector system 10, the structure is substantially closed by closing the various openings in the structure, such as the doors and windows or other such openings, for example. A fan is then snuggly fitted into one of the openings, such as a window opening, and the fan is sized and situated to create a negative air pressure within the structure.

The third bridge network 150 is adjusted by adjusting the potientiometer 148 so that the amplified third bridge error signal provided by the amplifier 152 substantially is zero in the absence of any substantial air flow through the opening 48 in the first detector housing 42 and the opening 86 through the second detector housing 80. Since the first bridge network 116 is in series with the second bridge network 136 and the first and the second bridge networks 116 and 136 each form one leg of the third bridge network 150, this initial adjustment of the third bridge network 150 causes the third bridge network 150 to be balanced even though there may be a change in ambient temperature or a change caused by a uniform air flow through both of the openings 48 and 86 in the first and the second detector housings 42 and 80, respectively, or, in other words, this initial balance of the third bridge network 150 is not affected by a change in ambient temperature or by a uniform air flow past both of the first and the second thermistor type detectors 50 and 87, respectively. Thus, large air currents flowing within the structure which flow through both of the openings 48 and 86 in the first and the second detector housings 42 and 80, respectively, do not affect the balance of the third bridge network 150 and the increase in air flows through the openings 48 and 86 in the first and the second detector housings 42 and 80, respectively, caused by moving the probe 12 do not effect the balance of the third bridge network 150.

After the balancing of the third bridge network 150, the probe 12 is moved about the structure and positioned so that one of the openings 48 or 86 in the first or the second detector housings 42 or 80, respectively, is disposed in close proximity to a suspected air infiltration site. If one of the openings 48 or 86 in the first or the second detector housings 42 or 80, respectively, is positioned in close proximity to a suspected air infiltration site, there will be an increase in the air flow through the one opening 48 or 86 which was positioned in close proximity to the suspected air infiltration site if in fact air is infiltrating through such suspect air infiltration site. An increase in the air flow through one of the openings 48 or 86 in the first or the second detector housings 42 or 80, respectively, results in an increase in the air flow past one of the thermistor type first or second detectors 50 or 87, respectively. This increase in air flow past one of the thermistor type detectors 50 or 87, causes an imbalance in the third bridge network 150 thereby causing a third bridge error signal to be produced via the third bridge network 150.

The third bridge network error signal is received by the meter 28 and the meter 28 provides a visual output indication indicating an increase in the air flow past one of the thermistor type first or second detectors 50 or 86, the direction of movement of the needle of the meter 28 providing a visual indication indicating the particular thermistor first or second detector 50 or 87 experiencing the increase in air flow. In addition, the third bridge error signal is amplified by the amplifier 152 and the amplified third bridge error signal biases the base of the transistor 174 via the diode 170 or 172. The biasing of the base of the transistor 174 conditions the transistor 174 in the on or conducting state and in the on or conducting state of the transistor 174, the oscillator 178 functions to provide an oscillating oscillator 178 output signal, the oscillator 178 output signal being connected to the speaker 26 and causing the speaker 26 to provide an audibly perceivable output indication indicating an increase in air flow past one of the thermistor type detectors 50 or 87.

Thus, the detector system 10 of the present invention provides a system which is virtually insensitive to large scale air currents within the structure and to motion of the probe 12 as the probe 12 is moved through the structure and positioned at various suspected air infiltration sites. Also, the detector system 10 is adapted so that the probe 12 is not sensitive to or, more particularly, cancels ambient temperature fluxations, since such ambient temperature fluxuations are ,experienced equally by both of the first and second detectors 50 and 87.

A thermistor is a solid state semiconducting device, the electrical resistance of which varies with temperature. Emperically, the power dissipated by the bead type thermistor (first or second detector 50 or 87) at a temperature ($T_s$) in air at a temperature ($T_O$) moving with a velocity (u) is defined as follows:

$$P = K(T_s - T_O)(1 + Cu^n), \qquad (1)$$

wherein "K" is the still-air dissipation constant of the thermistor and "C" and "n" are constants that depend on the geometry of the thermistor, "n" being approximately 0.6 with respect to the two particular thermistors 50 and 87 used in the example embodiment of the detector system 10 given below.

The resistance of a thermistor at a temperature ($T_s$) relative to its resistance at a temperature ($T_O$) is defined as follows:

$$\rho(T_s) = \rho(T_O) \exp(\beta/T_s - \beta/T_O), \quad (2)$$

wherein "$\beta$" is a constant of the thermistor material. A thermistor type first and second detector 50 and 87 further is characterized by a thermal time constant ($Y$) and a current time constant (the time dependence of the current after the application of a step function in voltage).

With respect to the first or the second bridge networks 116 or 136, the first or the second bridge error signal is amplified and fed back to excite the first or the second bridge network 116 or 136 to keep the thermistor type first or second detector 50 or 87 equal to resistances $\rho_1$ and $\rho_2$, respectively, which correspond to a temperature ($T_s$) where $\rho_1$ and $\rho_2$ are defined by the equations:

$$(\rho_1) = (R_{114})(R_{110})/(R_{112}) \text{ and}$$

$$(\rho_2) = (R_{134})(R_{130})/(R_{132}) \quad (3)$$

Assuming ($I_O + \Delta I$) and ($P_O + \Delta P$) represent the current through the thermistor detector 50 and 87 and the power dissipated by the thermistor detector 50 and 87 in the presence of air flowing at a velocity (u) at a temperature ($T_O$), the corresponding values of current and power are ($I_O$) and ($P_O$) when the velocity of the air is zero (u = O). Since the resistances $\rho_1$ and $\rho_2$ and the temperature ($T_s$) are held constant by feedback, then, ($\Delta P/P_O = Cu^n$) so that at a relatively low air velocity the following expression results since ($P_O = IO^2/\rho$):

$$\Delta I/I_O = \Delta P/2P_O = Cu^n/2 \quad (4)$$

Equation (4) above also describes the fractional increase in the total bridge excitation voltage ($\Delta V/V$) when $u > 0$ of either the first or the second bridge networks 116 or 136. Operation of the detector control 22 of the probe 12 in the constant resistance mode materially reduces the response time of the thermistor first or second detectors 50 or 87 to a change in power dissipation by insuring that the power dissipated in the thermistor first or second detector 50 or 87 is always that required to maintain its temperature at ($T_s$). Response times of less than one second are readily achieved by using thermistors for the first and second detectors 50 and 87 with thermal time constant of two seconds and a current time characteristic of twenty-five seconds.

With respect to either the first or the second bridge networks 116 or 136 utilizing a bead type thermistor of the type designated before having a resistance of 250 ohms at 65 degrees centigrade, a thermal time constant of two seconds, a "K" value of 0.7 milliwatts per degree centigrade and a "$\beta$" value of 3500, the bridge network 116 or 136 initially is adjusted so that no third bridge error signal is produced in the absence of air flow past the first or second detectors 50 or 87.

The enclosing of the thermistor detectors 50 and 87 in the relatively short straight sections (the bases 52 and 88) cooperates to reduce the sensitivity of the probe 12 to motion perpendicular to axes of the straight sections. Making the two thermistors (detectors 50 and 87) identical and placing the thermistor detectors 50 and 87 in the three bridge networks further reduces the sensitivity of the probe 12 to uniform air flow common to both thermistor detectors 50 and 87. For rapid response, it is important that the thermistor detectors 50 and 87 are operated in a constant resistance bridge. The placing of the first and second bridge networks 116 and 136 in series minimizes battery drain and cooperates to make the probe 12 less sensitive to ambient conditions.

In the present detector system 10, the two constant temperature thermistor detectors 50 and 87 are compared in a triple bridge configuration in which the series combination of the two first and second bridge networks 116 and 136 form one side of a third output bridge network 150 which is completed by potentiometer 148. When the air flow velocity past the first and second detectors 50 and 87 is zero (u=0), the third bridge network 150 is balanced when the resistances of the thermistor detectors 50 and 87 are equal to $\rho_1$ and $\rho_2$, respectively, and "f" (the fractional setting on potentiometer 148, is [$V_{02}/(V_{01}+V_{02})$] where "$V_{01}$" and "$V_{02}$" are the voltages across the first and the second bridges 116 and 136, respectively. In the presence of an air flow of velocity ($u_1$ or $u_2$) past thermistor type first and second detectors 50 and 87, respectively, the voltages across the first and the second bridges 116 and 136, respectively, are $V_1 = V_{01}(1+\Delta P_1/2P_{01})$ and $V_2 = (1+\Delta P_2/2P_{02})$ where ($\Delta P_1/P_{02}$) and ($\Delta P_2/P_{02}$) are the fractional increase in the power dissipation in the first and the second detectors 50 and 87, respectively. Thus, the third bridge error signal is proportional to ($\Delta P_1/P_{02} - \Delta P_2/P_{02}$) which is zero if ($u_1 = u_2$). If ($R_{114}$) = ($R_{134}$)($\rho_1$)/($\rho_2$), both thermistor detectors 50 and 87 will be at the same temperature ($T_s$) and will exhibit the same power dissipation in the presence of a uniform (or zero) flow. Thus ($V_{01}$)/($V_{02}$) is independent of ($T_0$), ($T_s$), or any uniform flow velocity. The ratio (f) is therefore independent of these quantities and the third bridge network 150 remains balanced as ($T_0$) varies. Furthermore, ($T_s$) can be selected to minimize battery drain.

The total voltage across the series combination of the two thermistor bridges (the first and the second bridge networks 116 and 136) when $u_1 = u_2 = 0$ is approximately constant (8.5 V) independent of the operating temperature. Battery life is therefore determined by the time required to discharge the battery to a voltage at which the amplifiers 122, 140 and 152 can no longer maintain the required excitation voltages across the first and second bridge networks 116 and 136. The operational amplifiers 122, 140 and 152 are selected so the output can swing to within 0.5 V of the negative supply. A battery supply current drain of 9 milliamps (corresponding to a set point of 300 ohms) yields approximately 100 hours of operation using alkaline batteries. The "battery low" condition is indicated by an excessively long time to achieve a balanced state when the power is turned on; at a supply voltage of 18 volts DC the circuit balances in two seconds, while at 9.5 volts DC the circuit requires more than fifteen seconds to balance. This difference is easily discerned and can be used as a battery low indicator.

The speaker 26 only slightly increases battery drain since it uses the current through the thermistor detectors 50 and 87 to operate. When the third bridge network 150 is balanced, the output of the amplifier 152 is biased (by the resistor 164) to a positive battery supply to a voltage approximately equal to the emitter of the transistor 174. An imbalance of the third bridge network 150 is amplified by the amplifier 152 and inverted by the inverter 156. The diodes 170 and 172 select the more negative of the outputs of the amplifier 152 and the inverter 156 which is then applied to the base of the transistor 174 turning the transistor 174 on and thus applying power to the oscillator 178 which drives the speaker 26. The alarm threshold is set by resistor 162. The LED 186 acts as a voltage regulator and dims in brightness when the audio alarm (speaker 26) is activated. When the thermistor detector 50 is cooled, the additional current required is supplied by the amplifier 122 and the current through the LED 186 alarm combination is constant. When the thermistor detector 87 is cooled, the amplifier 140 supplies the additional current to the second bridge network 136 through the LED 186 which increases the voltage across the LED 186 and resistor 188. Since the oscillator 178 frequency is voltage dependent, the audio tone produced by the speaker 26 indicates whether the thermistor detector 50 or 87 has been cooled.

In one operational embodiment, the thermistors 50 and 87 are identical in construction and each of the thermistors are of the type commercially available from Fenwal Inc. of Ashland, Mass., Fenwal Model No. GB31L1 (1000 ohm nominal with axial leads). In this operational embodiment, the various elements of the detector control 22 and the detector control circuit 36 portions thereof were as follows:

the resistors 110, 112, 130, 132, 164, 160, 155 and 157 each were 39 kilohms;
the resistor 188 was 30 ohms;
the resistor 190 was 2.2 kilohms;
the variable resistor 162 was a 25k kilohm variable resistor;
the resistor 184 was 1.5 kilohms;
the potentiometer 148 was 10 kilohms;
the capacitor 180 was 20 microfarads;
the capacitor 182 was 1 microfarads;
the transistor 174 was of the type designated "2N3906";
the resistor 176 was 5 kilohm;
the speaker 26 was a 32 ohm speaker;
the diodes 170 and 172 each were of the type designated "1N34A";
the diodes 166, 168 and 192 were of the type designated "1N34A";
the oscillator was of the type designated "LM3909";
the operational amplifiers 122, 140, 152 and 156 were of the type designated "LM324";
the battery power supply 118 provided an 18 volt DC operating electrical power supply;
the meter 28 was a ±100 microampere current meter with a 5 kilohm internal resistance (in the alternative, an external resistance could be connected in series with the meter 28);
the resistor 114 was in the range between 250 and 350 ohms; and
the resistor 134 was in the range between 250 and 350 ohms.

Changes may be made in the various elements, components and assemblies as described herein or in the steps or in the sequence of steps described herein without departing from the spirit and scope of the invention as defined in the following claims. Examples of these changes include, but are not limited to the following:

1. It is understood that the length and diameter of the bases 52 and 88 and first and second sections 60, 66, 96 and 102 of the detector housings 42 and 88 can be varied in size and in relation to each other.

2. The speaker 26 in conjunction with the oscillator 178 could be replaced by other audio signaling devices such as a piezoelectric transducer.

3. The audio indicating actuator network comprising the amplifier 152 and inverter 156 in conjunction with their associated components could be replaced with any other circuit yielding a similar function.

4. The first and second bridge networks 116 and 136 could be placed in parallel instead of in series and compared with appropriate voltage divider networks and a differential amplifier (this arrangement is generally not preferred as it increases the current drain on the battery power supply 118).

5. The resistor ratios $(R_{110})/(R_{112})$ and $(R_{130})/(R_{132})$ need not be unity as in the embodiment described above and could be changed along with the values of resistors $(R_{114})$ and $(R_{134})$ to change the voltage required to excite the first and the second bridge networks 116 and 136.

6. Hot wire detector elements could be used in place of the thermistor type detectors 50 and 87 with the appropriate modification of the feed back network as known in the art.

7. A single generally rectangularly shaped housing could be constructed with the opening 48 extending through such housing generally near one side of such housing and with the opening 86 extending through such housing generally near one side of such housing. A handle, then, might be connected to such a housing. In this embodiment, the first detector housing 42, the second detector housing 80 and the support 30 merely are incorporated in a single, integral structure, and the speaker 26, the meter 28 and the on-off switch 24 also could be located on such a housing.

What is claimed is:

1. A detector system for detecting air infiltration air flow, comprising:
   a first detector for sensing air flow and providing an output indication indicative of the sensed air-flow;
   a second detector for sensing air flow and providing an output indication indicative of the sensed air flow;
   a probe, the first detector being supported on the probe in one position and the second detector being supported on the probe on one other position spaced a distance from the first detector; and
   means for receiving the output indications provided by the first and the second detectors and for providing an output indication indicating an increase in the air flow sensed by one of the first and the second detectors relative to the air flow sensed by the other one of the first and the second detectors, comprising:
   means for providing an audibly perceivable output indication indicating an increase in the air flow sensed by one of the first and the second detectors relative to the air flow sensed by the other one of the first and the second detectors.

2. A detector system for detecting air infiltration air flow, comprising:
   a first detector for sensing air flow and providing an output indication indicative of the sensed air flow;
   a second detector for sensing air flow and providing an output indication indicative of the sensed air flow;
   a probe, the first detector being supported on the probe in one position and the second detector being supported on the probe in one other position spaced a distance from the first detector, comprising:

a first detector housing having a first end and a second end and an opening extending therethrough intersecting the first and the second ends thereof, at least a portion of the first detector being disposed within the opening in the first detector housing;

a second detector housing having a first end and a second end and an opening extending therethrough intersecting the first and the second ends thereof, at least a portion of the second detector being disposed within the opening in the second detector housing; and means for supporting the first detector housing spaced a distance from the second detector housing with the opening extending through the first detector housing being substantially parallel with the opening extending through the second detector housing; and means for receiving the output indications provided by the first and the second detectors and for providing an output indication indicating an increase in the air flow sensed by one of the first and the second detectors relative to the air flow sensed by the other one of the first and the second detectors.

3. The detector system of claim 2 wherein the first detector housing is defined further to include:

a base having a first end and a second end and an opening extending axially therethrough intersecting the first and second ends thereof, at least a portion of the first detector being disposed within a portion of the opening through the base;

a first section having a first end and a second end and an opening extending therethrough intersecting the first and the second ends thereof, the second end of the first section being connected to the first end of the base and the first end of the first section forming the first end of the first detector housing;

a second section having a first end and a second end and an opening extending therethrough intersecting the first and second ends thereof, the second end of the second section being connected to the second end of the base and the second section extending a distance from the second end of the base terminating with the first end of the second section forming the second end of the first detector housing, the opening through the second section being generally aligned with the opening through the base, and the opening through the first section being generally aligned with the opening through the second section; and wherein the second detector housing is defined further to include:

a base having a first end and a second end and an opening extending axially therethrough intersecting the first and second ends thereof, at least a portion of the first detector being disposed within a portion of the opening through the base;

a first section having a first end and a second end and an opening extending therethrough intersecting the first and the second ends thereof, the second end of the first section being connected to the first end of the base and the first end of the first section forming the first end of the second detector housing; and a second section having a first end and a second end and an opening extending therethrough intersecting the first and second ends thereof, the second end of the second section being connected to the second end of the base and the second section extending a distance from the second end of the base terminating with the first end of the second section forming the second end of the second detector housing, the opening through the second section being generally aligned with the opening through the base, the opening through the first section being generally aligned with the opening through the second section.

4. The detector system of claim 3 wherein the first section of the first detector housing is defined further as having walls extending generally outwardly from the second end toward the first end thereof thereby forming a conical-shaped first section; and wherein the second section of the first detector housing is defined further as having walls extending generaly outwardly from the second end toward the first end thereof thereby forming a generally conical-shaped second section, the first section, the base and the second section cooperating to form a venturi-shaped first housing detector; and wherein the first section of the second detector housing is defined further as having walls extending generally outwardly from the second end toward the first end thereof thereby forming a generally conical-shaped first section; and wherein the second section of the second detector housing is defined further as having walls extending generally outwardly from the second end toward the first end thereof thereby forming a generally conical-shaped second section, the first section, the base and the second section cooperating to form a venturi-shaped second detector housing.

5. The detector system of claim 2 wherein the probe is defined further to include:

a support having a first end and a second end, the first end of the support being connected to the first detector housing and the second end of the support being connected to the second detector housing, the support supporting the first and the second detector housings in a spaced apart relationship with the openings through the first and the second detector housings extending in a generally parallel relationship.

6. The detector system of claim 5 wherein the probe is defined further to include an arm having a first end and a second end, the first end of the arm being connected to the support, generally midway between the first and the second ends of the support, and the arm extending a distance generally perpendicularly from the support.

7. The detector system of claim 6 wherein the support is defined further as being generally cylindrically shaped having an opening extending therethrough; and wherein the arm is defined further as being generally cylindrically shaped and having an opening extending therethrough.

8. The detector system of claim 7 wherein the means for receiving the output indications provided by the first and the second detectors and for providing an output indication indicating an increase in the air flow sensed by one of the first and the second detectors relative to the air flow sensed by the other of the first and the second detectors is defined further as being disposed and supported within the openings in the arm and the support.

9. The detector system of claim 2 wherein the means for providing an output indication indicating the increase in the air flow sensed by one of the first and the second detectors relative to the air flow sensed by the other one of the first and the second detectors is defined further to include:

means for providing a visually perceiving output indication indicating an increase in the air flow sensed by one of the first and the second detectors relative to the air flow sensed by the other one of the first and the second detectors.

10. The detector system of claim 2 wherein the first and the second detectors each are defined further as being thermistors, and wherein the means for receiving the output indications provided by the first and the second detectors and for providing an output indication indicating an increase in the air flow sensed by one of the first and the second detectors relative to the air flow sensed by the other one of the first and the second detectors is defined further to include:

a first bridge network having the first detector connected thereto and forming one leg portion of the first bridge network, the first bridge network providing a first bridge error signal in response to changes in the resistance value of the first detector;

a second bridge network with the second detector forming one leg portion of the second bridge network, the second bridge network providing a second bridge error signal in response to changes in the resistance value of the second detector; and means for receiving first and the second bridge error signals provided by the first bridge network and the second bridge network and for providing an output indication indicating an increase in one of the first and the second bridge error signals relative to the other one of the first and the second bridge error signals.

11. The detector system of claim 10 wherein the means for receiving the first and second bridge error signals is defined further to include:

an operational amplifier receiving the first bridge error signal and amplifying the received first bridge error signal, the operational amplifier providing an output amplified first bridge error signal and the outputted amplified first bridge error signal being connected to and fed back to the first bridge network; and an operational amplifier receiving the second bridge error signal and amplifying the received second bridge error signal, the operational amplifier providing an output amplified second bridge error signal and the outputted amplified second bridge error signal being connected and fed back to the second bridge network.

12. A detector system for detecting air infiltration leaks in a structure comprising the steps of:

sensing air flow within portions of the structure via a first detector disposed in a first detector housing having a first end and a second end and an opening extending therethrough intersecting the first and the second ends thereof with at least a portion of the first detector being disposed within the opening in the first detector housing and providing an output indication indicative of the sensed air flow;

sensing air flow within portions of the structure via a second detector disposed in a second detector housing having a first end and a second end and an opening extending therethrough intersecting the first and the second ends thereof with at least a portion of the second detector being disposed within the opening in the second detector housing and providing an output indication indicative of the air flow sensed by the second detector;

supporting the first detector housing and second detector housing on a probe, the first detector housing being spaced a distance from the second detector housing with the opening extending through the first detector housing being substantially parallel with the opening extending through the second detector housing; and receiving the output indications of the first and the second detectors and providing an output indication indicating an increase in air flow sensed by one of the first and the second detectors relative to the air flow sensed by the other one of the first and the second detectors.

13. The detector system of claim 12 defined further to include the step of:

moving the first and the second detectors about the structure to position one of the first and the second detectors near suspected air infiltration sites.

14. The detector system of claim 12 defined further to include the step of:

creating a negative pressure within the structure prior to sensing air flow with the first and the second detectors.

15. The detector system of claim 12 wherein the step of sensing air flow with the first detector and providing an output indication indicative of the sensed flow is defined further to include the step of: providing a first bridge error output signal from a first bridge network, the first detector comprising one leg of the first bridge network and the first bridge error signal indicating a change in the air flow sensed by the first detector; and wherein the step of sensing the air flow with the second detector is defined further to include the step of: providing a second bridge error output signal from a second bridge network, the second detector comprising one leg of the second bridge network and the second bridge error signal indicating a change in the air flow sensed by the second detector.

16. The detector system of claim 15 wherein the step of providing an output indication indicating an increase in the air flow sensed by one of the first and the second detectors relative to the air flow sensed by the other one of the first and the second detectors is defined further to include the steps of:

receiving the first bridge error output signal and amplifying the first bridge error signal;

feeding back the amplified first bridge error signal to the first bridge network;

receiving the second bridge error output signal provided by the second bridge network and amplifying the second bridge error signal; and feeding back the amplified second bridge error signal to the second bridge network.

17. A detector system for detecting air infiltration air flow, comprising:

a first detector comprising a thermistor for sensing air flow and providing an output indication indicative of the sensed air flow;

a second detector comprising a thermistor for sensing air flow and providing an output indication indicative of the sensed air flow;

a probe, the first detector being supported on the probe in one position and the second detector being supported on the probe in one other position spaced a distance from the first detector; and means for receiving the output indications provided by the first and the second detectors and for providing an output indication indicating an increase in the air flow sensed by one of the first and the second detectors relative to the air flow sensed by the other one of the first or the second detectors, comprising:
- a first bridge network having the first detector connected thereto and forming one leg portion of the first bridge network, the first bridge network providing a first bridge error signal in response to changes in the resistance value of the first detector;
- a second bridge network with the second detector forming one leg portion of the second bridge network, the second bridge network providing a second bridge error signal in response to changes in the resistance value of the second detector and the first bridge network being connected in series with the second bridge network; and
- means for receiving the first and the second bridge error signals provided by the first bridge network and the second bridge network and for providing an output indication indicating an increase in one of the first and the second bridge error signals relative to the other one of the first and the second bridge error signals, comprising:
  - an operational amplifier receiving the first bridge error signal and amplifying the received first bridge error signal, the operational amplifier providing an output amplified first bridge error signal and the outputted amplified first bridge error signal being connected to and fed back to the first bridge network; and
  - an operational amplifier receiving the second bridge error signal and amplifying the received second bridge error signal, the operational amplifier providing an output amplified second bridge error signal and the outputted amplified second bridge error signal being connected to and fed back to the second bridge network; and
  - a potentiometer connected to the first and the second bridge networks so the first and the second bridge networks and the potentiometer combine to form a third bridge network for providing a third bridge error signal, the first bridge network forming one leg of the third bridge network and the second bridge network forming one other leg of the third bridge network.

18. The detector system of claim 17 wherein the means for providing the output indication indicating an increase in the air flow sensed by one of the first and the second detectors relative to the air flow sensed by the other one of the first and the second detectors is defined further to include:
- means connected to the third bridge network for receiving the third bridge error signal and for providing a visually perceivable output indication of the third bridge error signal, the visually perceivable output indication provided by said means indicating an increase in the air flow sensed by one of the first and the second detectors relative to the air flow sensed by the other one of the first and the second detectors.

19. The detector system of claim 17 wherein the means for providing the output indication indicating an increase in the air flow sensed by one of the first and the second detectors relative to the air flow sensed by the other one of the first and the second detectors is defined further to include:
- means for providing an audible output indication; and
- means for receiving the third bridge error signal and for causing said means to provide an audible indication indicating an increase in one of the first and the second bridge error signals relative to the other one of the first and the second bridge error signals.

20. The detector system of claim 19 wherein the means for receiving the third bridge air signal and for causing the speaker to provide the audible output indication is defined further to include:
- an oscillator for providing an oscillating output signal, the oscillator output signal being connected to the means for providing the audibly perceivable output indication and said means providing the audibly perceivable output indication in response to receiving the oscillator output signal; and
- a transistor having a portion thereof receiving the third bridge error signal, the transistor being connected to the oscillator, the transistor having an on condition and an off condition and the transistor causing the oscillator to provide an oscillating output signal in the on condition of the transistor, the transistor being biased in the on condition by a received third bridge error signal indicating an increase in one of the first and second bridge error signals relative to the other one of the first and the second bridge error signals.

21. The detector system of claim 20 wherein the means for receiving the third bridge error signal is defined further to include:
- an inverter receiving the amplified third bridge error signal and providing an inverted third bridge error signal output thereof; and
- a pair of diodes, one of the diodes receiving the inverted third bridge error signal and the other one of the diodes receiving the third bridge error signal, the diodes cooperating to select the most negative of the received inverted third bridge error signal and the third bridge error signal and the diodes being connected to the transistor for conducting the most negative of one of the received inverted third bridge error signal and the third bridge error signal, the transistor being biased in the on condition in response to receiving a signal from one of the diodes.

22. The detector system of claim 17 defined further to include:
- a light emitting diode connected to the third bridge network for indicating a circuit on condition.

23. A detector system for detecting air infiltration leaks in a structure comprising the steps of:
- sensing air flow via a first detector and providing an output indication indicative of the sensed air flow, comprising the step of:
  - providing a first bridge error output signal from a first bridge network, the first detector comprising one leg of the first bridge network and the first bridge error signal indicating a change in the air flow sensed by the first detector;
- sensing air flow via a second detector disposed near and spaced a distance from the first detector and providing an output indication indicative of the air flow sensed by the second detector, comprising the step of:

providing a second bridge error output signal from a second bridge network, the second detector comprising one leg of the second bridge network and the second bridge error signal indicating a change in the air flow sensed by the second detector; and receiving the output indications of the first and the second detectors and providing an output indication indicating an increase in the air flow sensed by one of the first and the second detectors relative to the air flow sensed by the other one of the first and the second detectors, comprising the steps of:

receiving the first bridge error output signal and amplifying the first bridge error output signal;

feeding back the amplified first bridge error signal to the first bridge network;

receiving the second bridge error output signal provided by the second bridge network and amplifying the second bridge error signal;

feeding back the amplified second bridge error signal to the second bridge network;

providing a third bridge error signal via a third bridge network, the third bridge network including the first bridge network as one leg thereof and the second bridge network as one other leg thereof; and receiving the third bridge error signal and providing the output indication indicating an increase in the air flow sensed by one of the first and the second detectors relative to the air flow sensed by the other one of the first and the second detectors in response to the received third bridge error signal.

24. The detector system of claim 23 wherein the step of providing the output indication indicating an increase in the air flow sensed by one of the first and the second detectors relative to the air flow sensed by the other one of the first and the second detectors is defined further to include the steps of:

receiving the third bridge error signal and providing an audible output indication indicating a change in the third bridge error signal thereby indicating an increase in the air flow sensed by one of the first and the second detectors relative to the air flow sensed by the other one of the first and the second detectors.

25. The detector system of claim 23 wherein the step of providing the output indication indicating an increase in the air flow sensed by one of the first and the second detectors relative to the air flow sensed by the other one of the first and the second detectors is defined further to include the step of:

receiving the third bridge error signal and providing a visually perceivable output indication indicating a change in the third bridge error signal thereby indicating an increase in the air flow sensed by one of the first and the second detectors relative to the air flow sensed by the other one of the first and the second detectors.

* * * * *

UNITED STATES PATENT AND TRADEMARK OFFICE
CERTIFICATE OF CORRECTION

PATENT NO. :   4,609,912

DATED :   September 2, 1986

INVENTOR(S) :   Stewart R. Ryan

It is certified that error appears in the above-identified patent and that said Letters Patent is hereby corrected as shown below:

Column 13, Line 9, please delete the letter "Y" and substitute therefor --T--.

Column 16, Line 45, immediately following the word "probe", please delete the word "on" and substitute therefor --in--.

Signed and Sealed this

Thirtieth Day of December, 1986

Attest:

DONALD J. QUIGG

*Attesting Officer*    *Commissioner of Patents and Trademarks*